United States Patent
Liu et al.

(10) Patent No.: US 12,273,271 B2
(45) Date of Patent: Apr. 8, 2025

(54) DATA TRANSMISSION METHOD, RELATED APPARATUS, AND NETWORK

(71) Applicant: HUAWEI TECHNOLOGIES CO., LTD., Shenzhen (CN)

(72) Inventors: Fang Liu, Hong Kong (CN); Wing Shing Wong, Hong Kong (CN); Weijie Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 361 days.

(21) Appl. No.: 16/886,894

(22) Filed: May 29, 2020

(65) Prior Publication Data
US 2020/0296043 A1 Sep. 17, 2020

Related U.S. Application Data

(63) Continuation of application No. PCT/CN2018/117821, filed on Nov. 28, 2018.

(30) Foreign Application Priority Data

Nov. 30, 2017 (CN) .......................... 201711245559.0

(51) Int. Cl.
*H04L 47/125* (2022.01)
*H04L 45/44* (2022.01)

(52) U.S. Cl.
CPC ............ *H04L 47/125* (2013.01); *H04L 45/44* (2013.01)

(58) Field of Classification Search
CPC .............................. H04L 47/125; H04L 45/44
See application file for complete search history.

(56) References Cited

U.S. PATENT DOCUMENTS

| 5,101,451 A | * | 3/1992 | Ash | H04Q 3/66 379/112.05 |
| 2003/0200333 A1 | * | 10/2003 | Espieu | H04L 45/24 709/240 |

(Continued)

FOREIGN PATENT DOCUMENTS

| CN | 101399770 A | 4/2009 |
| CN | 105324964 A | 2/2016 |

(Continued)

OTHER PUBLICATIONS

Medhi et. al. "ProTE: An OpenFlow based Traffic Engineering Mechanism for Dta Center Networks", p. 149-154, 2017 International Conference on Advances in Computing, Communications and Informatics (ICACCI), Sep. 13-16, 2017. (Year: 2017).*

(Continued)

*Primary Examiner* — Derrick W Ferris
*Assistant Examiner* — Jeremy Paul Muday
(74) *Attorney, Agent, or Firm* — Rimon PC

(57) ABSTRACT

A data transmission method, and a related apparatus, are provided. The method include: determining, by a first controller in available transit switches in a data center network, available transit switches respectively transiting m groups of data, where one available transit switch is configured to transit at least one group of the data, and a difference between quantities of groups of the data transited by any two available transit switches does not exceed a second threshold; and instructing, by the first controller, a destination network node to send routing information to the source network node, where the routing information includes an identifier of an available transit switch configured to transit a data group transmitted by the source network node to the destination network node. The foregoing solution can balance load of each transit switch in the data center network, (Continued)

improve a bandwidth resource utilization rate, and reduce a transmission delay.

16 Claims, 6 Drawing Sheets

(56) References Cited

U.S. PATENT DOCUMENTS

| | | | |
|---|---|---|---|
| 2014/0007231 A1* | 1/2014 | Li | H04L 63/1475 726/22 |
| 2014/0140279 A1* | 5/2014 | Barrett | H04L 41/0806 370/328 |
| 2014/0177447 A1* | 6/2014 | Venkataswami | H04L 47/29 370/252 |
| 2015/0127797 A1 | 5/2015 | Attar et al. | |
| 2015/0312134 A1* | 10/2015 | Kapadia | H04L 45/02 370/255 |
| 2016/0226742 A1* | 8/2016 | Apathotharanan | H04L 45/64 |
| 2016/0337236 A1* | 11/2016 | Hsu | H04L 61/103 |
| 2016/0353325 A1* | 12/2016 | Poikonen | H04W 28/088 |
| 2017/0230260 A1 | 8/2017 | Gueta et al. | |
| 2017/0237624 A1 | 8/2017 | Dalal | |
| 2017/0295100 A1 | 10/2017 | Hira et al. | |
| 2017/0295514 A1* | 10/2017 | Uchida | H04L 67/1008 |
| 2017/0331728 A1 | 11/2017 | Venkataswami et al. | |
| 2018/0062930 A1* | 3/2018 | Dhesikan | H04L 41/22 |
| 2019/0104069 A1* | 4/2019 | Kommula | H04L 47/125 |
| 2019/0166043 A1* | 5/2019 | Lee | H04L 45/38 |
| 2020/0374745 A1* | 11/2020 | Sayenko | H04W 28/0284 |

FOREIGN PATENT DOCUMENTS

| | | |
|---|---|---|
| CN | 106911584 A | 6/2017 |
| CN | 107113233 A | 8/2017 |

OTHER PUBLICATIONS

Nabajyoti Medhi et al, "ProTE: An OpenFlow based Traffic Engineering Mechanism for Data Center Networks", Published in: 2017 International Conference on Advances in Computing, Communications and Informatics (ICACCI), Date of Conference: Sep. 13, 2017, total 6 pages. XP033275938.

Soudeh Ghorbani et al., "DRILL: Micro Load Balancing for Low-latency Data Center Networks", SIGCOMM 17, Aug. 21, 2017, Los Angeles, CA, USA, total 14 pages. XP058370902.

C. Hopps, Analysis of an Equal-Cost Multi-Path Algorithm, RFC 2992, IETF, Nexthop Technologies, Nov. 1, 2000. total 8 pages.

J. Perry et al, Fastpass: A Centralized Zero-Queue Datacenter Network, SIGCOMM 14, Aug. 17, 2014, Chicago, IL, USA. pp. 307-318.

C. Colbourn et al., Prelims from: Handbook of combinatorial designs . CRC Press, Nov. 2, 2006, abstract. Total 27 pages.

* cited by examiner

DATA TRANSMISSION METHOD, RELATED APPARATUS, AND NETWORK

CROSS-REFERENCE TO RELATED APPLICATIONS

This application is a continuation of International Application No. PCT/CN2018/117821, filed on Nov. 28, 2018, which claims priority to Chinese Patent Application No. 201711245559.0, filed on Nov. 30, 2017. The disclosures of the aforementioned applications are hereby incorporated by reference in their entireties.

TECHNICAL FIELD

This application relates to the field of data centers (DC) and traffic scheduling technologies, and in particular, to a data transmission method, a related apparatus, and a network.

BACKGROUND

A data center is a network used to transfer, accelerate, present, compute, and store data information on an Internet infrastructure, and may include a computer system and another system matching the computer system (for example, a communications and storage system), a data communications connection device, an environment control device, a monitoring device, and various security apparatuses. Data centers are widely used in distributed storage, big data analysis, and the like.

Currently, network topologies of most data centers are implemented as multistage switching networks, for example, a fat-tree (fat tree) network and a leaf-and-spine network (leaf and spine architecture). In a data center network, a transit device (for example, a core switch in the fat-tree network or a spine switch in the leaf-and-spine network) having a function of transiting data has a very high utilization rate, and load of each transit device, that is, an amount of data transited by each transit device affects a transmission delay, a bandwidth resource utilization rate, and the like of the entire data center network. Therefore, how to balance the load of each transit device to reduce a data packet transmission delay and improve the bandwidth resource utilization rate is an urgent problem to be resolved.

SUMMARY

This application provides a data transmission method, a related apparatus, and a network, to balance load of each transit switch in a data center network, improve a bandwidth resource utilization rate, and reduce a transmission delay.

According to a first aspect, this application provides a data transmission method, applied to a first controller side. The method may include: determining, by a first controller in available transit switches in a data center network, available transit switches respectively transiting m groups of data, where the m groups of data are data transmitted by one or more source network nodes connected to m source switch groups to a destination network node connected to a destination switch group; the data center network includes a plurality of transit switches, the m source switch groups, the destination switch group, the one or more source network nodes, and the destination network node; the available transit switch is a transit switch that is in the plurality of transit switches and whose load does not exceed a first threshold; and m is a positive integer, where one available transit switch is configured to transit at least one group of the data, and a difference between quantities of groups of the data transited by any two available transit switches does not exceed a second threshold; and instructing, by the first controller, the destination network node to send routing information to the source network node, where the routing information includes an identifier of an available transit switch configured to transit a data group transmitted by the source network node to the destination network node.

Specifically, the data center network in this application includes a plurality of transit switches, switch groups, a controller, and network nodes. Each switch group is connected to all transit switches. The controller controls the switch groups and network nodes connected to the switch groups.

In a data transmission process, a data transmission path is: a network node-a switch group-a transit switch-another switch group-another network node. In this application, a network node sending data is referred to as a source network node, a switch group connected to the source network node is referred to as a source switch group, a controller controlling the source switch group and the source network node connected to the source switch group is referred to as a first controller, a network node receiving data is referred to as a destination network node, and a switch group connected to the destination network node is referred to as a destination switch group.

Optionally, in this application, the data center network is a fat-tree network, the transit switch is implemented as a core switch, the switch group is implemented as a basic physical switching unit (for example, a point of delivery, POD), and the controller controls the POD and a network node connected to the POD.

Optionally, in this application, the data center network is a leaf-and-spine network, the transit switch is implemented as a spine switch, the switch group is implemented as a leaf switch, and the controller controls the leaf switch and a network node connected to the leaf switch.

By implementing the method described in the first aspect, load of each transit switch can be balanced, a bandwidth resource utilization rate can be improved, and a transmission delay can be reduced.

With reference to the first aspect, in some embodiments, before determining, in the available transit switches in the data center network, the available transit switches respectively transiting the m groups of data, the first controller further needs to determine currently available transit switches in all the transit switches in the data center network.

In this application, data is transmitted by multiple times, and the first controller determines currently available transit switches before each time of data transmission.

The following describes a method for determining the available transit switch by the first controller in this application. In this application, each transit switch has an explicit congestion notification (explicit congestion notification, ECN) function. When a data packet arrives at a transit switch, if current load of the transit switch exceeds the first threshold, the transit switch changes a value of an ECN field of the data packet into a second value; or if load does not exceed the first threshold, the transit switch does not change an ECN field of the data packet, or changes an ECN field of the data packet to set a value of the ECN field of the data packet to a first value. Optionally, the first value and the second value may be predefined. Optionally, the first threshold may be prestored or preconfigured by the first controller based on a processing capability of the transit switch.

(1) In an initialization stage, that is, when the source network nodes transmit initial data packets to the destination network node, transmission paths of the initial data packets cover all the transit switches. The first controller obtains initial data packets from all the transit switches, and when a value of an ECN field of an initial data packet is the first value, determines that a transit switch sending the data packet is an available transit switch; or when a value of an ECN field of an initial data packet is the second value, determines that a transit switch sending the data packet is an unavailable transit switch.

(2) In a data transmission stage after initialization: after the initialization, the source network node determines a data transmission path based on the transit switch determined by the first controller. Using second data transmission as an example, during the second data transmission, some of the transit switches in the data center network are used, and other transit switches are not used.

The used transit switches are transit switches determined by the first controller in the initialization stage to send data in the second data transmission. The first controller may determine an available transit switch in the used transit switches based on an ECN field of a data packet in the second data transmission.

The other unused transit switches are unavailable transit switches determined by the first controller in the initialization stage. In the initialization stage, since the first controller determines the unavailable transit switches and after preset duration, the first controller considers that these transit switches are available transit switches.

With reference to the first aspect, in some embodiments, to implement that the difference between quantities of groups of the data transited by any two available transit switches does not exceed the second threshold, when determining the available transit switches respectively transiting the m groups of data, the first controller determines that a quantity of groups of the data transited by any available transit switch does not exceed [mk/v], where k is a quantity, determined by the first controller, of available transit switches transiting one group of the data, and v is a quantity of the available transit switches in the data center network.

With reference to the first aspect, in some embodiments, to implement that one available transit switch is configured to transit at least one group of the data and the difference between quantities of groups of the data transited by any two available transit switches does not exceed the second threshold, the first controller may determine, based on a packing sequence, the available transit switches respectively transiting the m groups of data. Details are as follows.

First, the packing sequence is described. In the data center network, a plurality of controllers each may prestore a plurality of same packing sequence groups based on three parameters: V, K, and M, where A, 1≤V≤A, 1≤K≤A, 1≤M≤B. A is a quantity of the transit switches in the data center network, and B is a quantity of the switch groups.

Specifically, a packing sequence group constructed based on V, K, and M meets the following three conditions:
1. One packing sequence group includes M packing sequences.
2. Any one of the M packing sequences includes V elements. In the V elements, when V>K, K elements are set to a third value: and when V≤K, V elements are set to the third value.
3. In each of the M packing sequences, any element can be set to the third value for at most [M/V] times. The third value may be predefined. This is not limited in this application. For example, the third value may be 1.

As can be known, one packing sequence group has the following features: In the M packing sequences in the packing sequence group, any element is set to the third value for at least once, and each element is set to the third value for an approximately same quantity of times.

Second, a process in which the first controller determines, based on the packing sequence, the available transit switches respectively transiting the m groups of data is described.

Specifically, the first controller finds one corresponding packing sequence group in the plurality of prestored packing sequence groups based on three parameters: V=v, K=k, and M=m, where v is the quantity of the available transit switches, k is the quantity of available transit switches transiting one group of data, and m is the quantity of the source switch groups.

In the corresponding packing sequence group, one source switch group corresponds to one packing sequence, and the packing sequence includes v elements, and the v elements respectively correspond to v available transit switches in the data center network; and when a value of an element is the third value, an available transit switch corresponding to the element is a transit switch transiting the data transmitted by the one or more source network nodes connected to the source switch groups to the destination network node connected to the destination switch group.

In this application, the first controller determines, based on the packing sequence, the available transit switches respectively transiting the m groups of data. In this way, load of each available transit switch in the data center network can be balanced, a bandwidth resource utilization rate can be improved, and a transmission delay can be reduced.

With reference to the first aspect, in some embodiments, the routing information is carried in an acknowledgement signal.

According to a second aspect, this application provides a controller. The controller may include a plurality of functional modules, configured to correspondingly perform the method provided in the first aspect or the method provided in any of the possible implementations of the first aspect.

According to a third aspect, this application provides a controller, configured to perform the data transmission method described in the first aspect. The controller may include a memory and a processor coupled to the memory. The memory is configured to store implementation code of the data transmission method described in the first aspect. The processor is configured to execute the program code stored in the memory, that is, perform the method provided in the first aspect or the method provided in any one of the possible implementations of the first aspect.

According to a fourth aspect, this application provides a network. The network includes a controller, a transit switch, a switch group, and a network node. The controller may be the controller described in the second aspect or the third aspect.

According to a fifth aspect, a computer-readable storage medium is provided. The readable storage medium stores an instruction. When the instruction is run on a computer, the computer is enabled to perform the data transmission method described in the first aspect.

According to a sixth aspect, a computer program product including an instruction is provided. When the computer program product is run on a computer, the computer is enabled to perform the data transmission method described in the first aspect.

During implementation of this application, the first controller determines, in the available transit switches in the data center network, the available transit switches respectively transiting the m groups of data, where one available transit switch is configured to transit at least one group of the data, and the difference between quantities of groups of the data transited by any two available transit switches does not exceed the second threshold. This application can balance load of each transit switch in the data center network, improve a bandwidth resource utilization rate, and reduce a transmission delay.

DESCRIPTION OF EMBODIMENTS

Some terms used in embodiments of this application are used to merely explain the embodiments of this application, with no intention to limit this application.

Figure 1A:
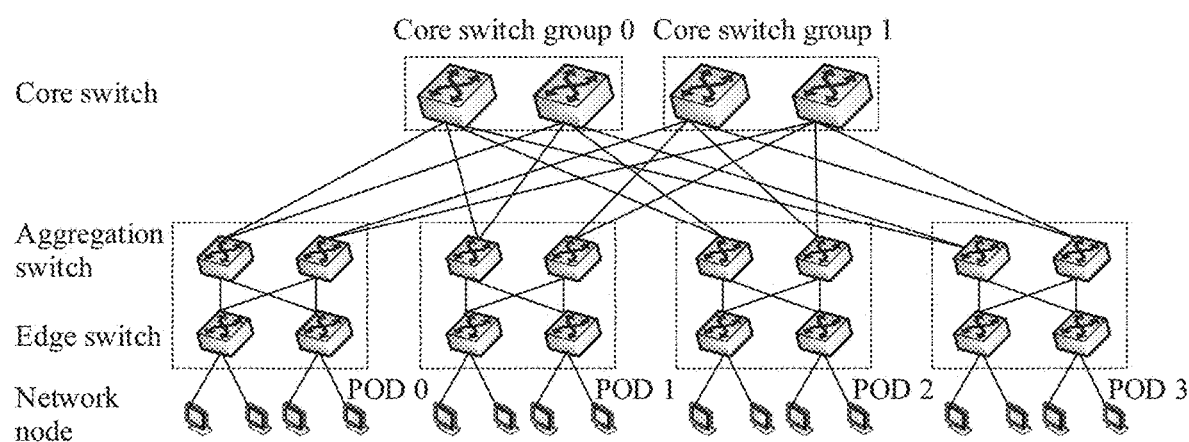
FIG. 1A is a schematic structural diagram of a fat-tree network in the prior art.

Currently, a data center network usually uses a hierarchical topology. The following briefly describes two common data center networks based on the hierarchical topology: a fat-tree network and a leaf-and-spine network.
(I) Fat-Tree Network
FIG. 1A is a schematic structural diagram of a Clos-based fat-tree network having four elements.

A fat-tree network structure having n elements, that is, a fat-tree network structure including n data center basic physical switching units (point of delivery, POD), includes $n^2/4$ core switches, $n^2/2$ aggregation switches, $n^2/2$ edge switches, and $n^3/4$ network nodes.

Every $n/2$ aggregation switches and $n/2$ edge switches form one POD. In any POD, each edge switch is connected to $n/2$ different network nodes, and each edge switch is connected to $n/2$ aggregation switches on an upper layer.

Every $n/2$ core switches form one core switch group. All core switches in a $t^{th}$ core switch group are connected to a $t^{th}$ aggregation switch in each POD, where $0 \le t \le n/2$.

Figure 1B:
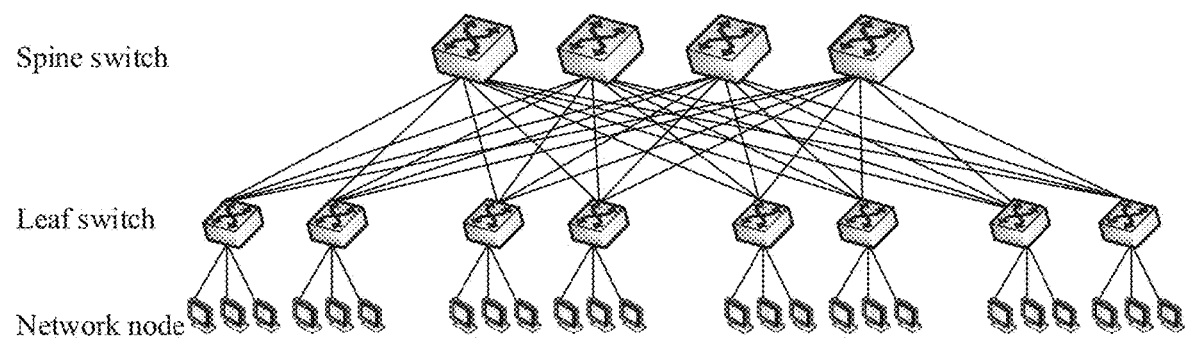
FIG. 1B is a schematic structural diagram of a leaf-and-spine network in the prior art.

As can be learned from FIG. 1A, in a fat-tree network topology having n elements, each POD is connected to all core switches. In a determined POD, an aggregation switch connected to a core switch is unique.
(II) Leaf-and-Spine Network
FIG. 1B is a schematic diagram of a leaf-and-spine network topology. The leaf-and-spine network topology includes spine switches and leaf switches, and each leaf switch is connected to all the spine switches. As shown in FIG. 1B, a quantity of network nodes connected to each leaf switch is related to a quantity of downlink ports of the leaf switch.

It can be understood that all connected devices mentioned in FIG. 1A and FIG. 1B are connected through ports.

As can be known from the above, in a data center network based on a hierarchical topology, there may be a plurality of paths running through different transit devices (for example, core switches in a fat-tree network and spine switches in a leaf-and-spine network) between any two network nodes.

Currently, in the data center network, a data transmission path is usually scheduled by using the following two methods: distributed scheduling and centralized scheduling.
(1) Distributed Scheduling
An equal-cost multi-path (equal-cost multi-path, ECMP) forwarding technology based on a hash (hash) algorithm is one of typical distributed scheduling technologies. In ECMP, referring to the fat-tree network shown in FIG. 1A, there are a plurality of data transmission paths between two PODs. In other words, when a network node connected to one POD transmits data to a network node connected to another POD, a plurality of equal candidate paths exist, and the data is transmitted through the plurality of candidate paths based on the hash algorithm.

Because the hash algorithm is essentially random mapping, it is possible that two or more elephant flows (data flows with long duration and high bandwidth requirements) select a same path at the same time. As a result, data flows collide, bandwidth resources are not evenly allocated, and a utilization rate is low.
(II) Centralized Scheduling
In a centralized scheduling method, a centralized controller collects global information in the data center network, including all data packet information, data request information of a destination network node, a status of each switch, and the like, to allocate an optimal route to each data packet, so as to balance load of each transit device.

Although an optimal path selection solution for each data packet may be obtained by using the centralized scheduling method, such a scheduling method requires a large amount of information interaction, and a process of collecting the information by the centralized controller occupies a bandwidth resource, causing extra overheads to the data center network. In addition, such a scheduling method has high computational complexity and a long response time.

As can be learned from the above, in the data center network, the key to balancing load is to balance workload of a transit device (for example, a core switch in a fat-tree network or a spine switch in a leaf-and-spine network) having a function of transiting data.

This application provides a data center network, which may balance workload of each transit device by using a controller, to balance load.

Figure 2:
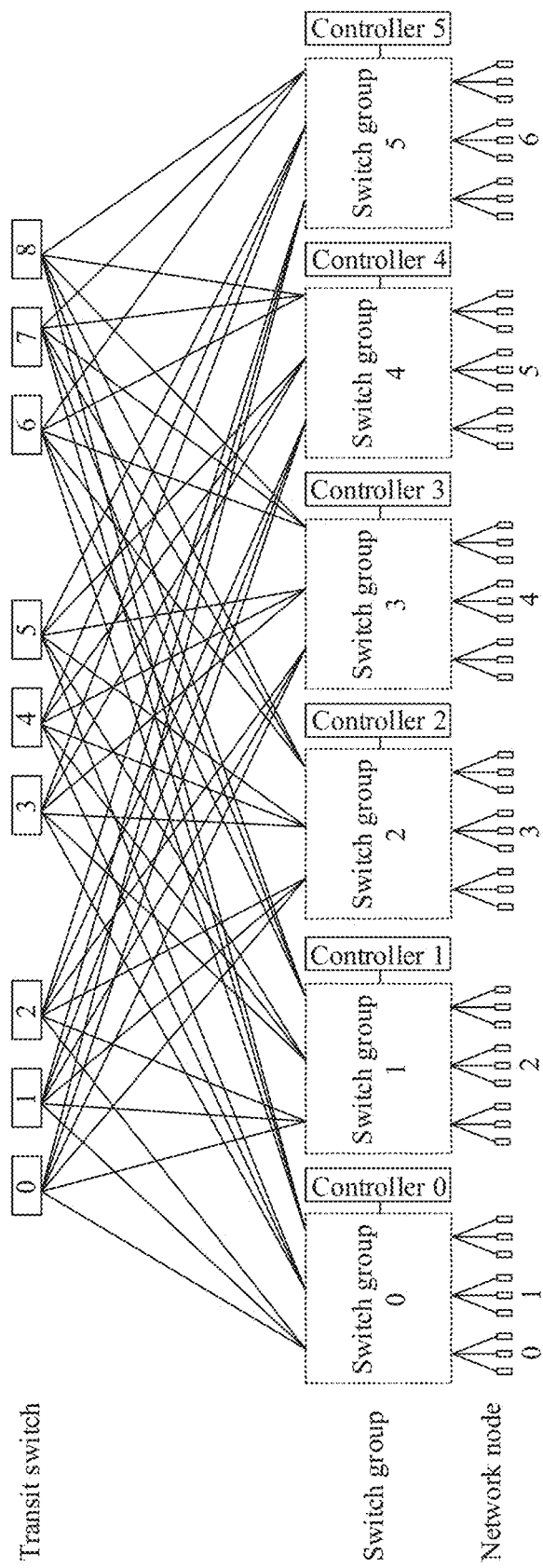
FIG. 2 is a schematic structural diagram of a data center network according to this application.

Referring to FIG. 2, a data center network in this application includes: a plurality of transit switches, a plurality of switch groups, a plurality of controllers, network nodes connected to the plurality of switch groups. Any switch group is connected to all transit switches, the plurality of switch groups each are connected to different network nodes, and one switch group is connected to one controller.

It can be understood that all connected devices mentioned in FIG. 2 are connected through ports.

It can be understood that not limited to the foregoing mentioned devices, during specific implementation, the data center network in this application may further include another device. This is not limited in this application.

The following describes network elements in the data center network.

(I) Transit Switch

The transit switch is a switch that is on an uppermost layer in the data center network and that is configured to transit data, and may be the core switch in the fat-tree network shown in FIG. 1A, or the spine switch in the leaf-and-spine network shown in FIG. 1B, or a switch configured to transit data in another data center network based on a hierarchical topology.

In this application, the transit switch has an explicit congestion notification (explicit congestion notification, ECN) function. The following briefly describes the process of implementing the ECN function by the transit switch.

1. When a data packet arrives at the transit switch, the transit switch checks a destination address of the data packet.

2. The transit switch determines, based on the destination address of the data packet, an egress port configured to forward the data packet.

It can be understood that the transit switch has a plurality of egress ports. After determining the destination address of the data packet, the transit switch can uniquely determine the egress port configured to forward the data packet.

3. The transit switch checks load of the egress port.

The load of the egress port may be determined by factors such as a quantity of to-be-forwarded data packets at the egress port, a speed of forwarding the data packets by the egress port. A larger quantity of to-be-forwarded data packets or a lower forwarding speed indicates larger load of the egress port.

4. If current load of the egress port exceeds a first threshold, the transit switch sets an ECN field of the newly arrived data packet to a second value, indicating that the quantity of data packets that currently need to be forwarded by the egress port is excessively large, and congestion is occurring. If current load of the egress port does not exceed the first threshold, the transit switch does not change the ECN field of the data packet, and the ECN field of the data packet may be set to a first value, indicating that the egress port may further forward a new data packet currently.

The first threshold may be preset. Optionally, the first threshold may be set based on a processing capability of the transit switch. The first value and the second value may be predefined.

For example, as shown in FIG. 2, assuming that a network node 0 sends a data packet to a network node 3, a destination address in the data packet is an address of the network node 3, and a transmission path of the data packet runs through a transit switch 0. It is assumed that the transit switch 0 and a switch group 2 are connected through an egress port 0. The transit switch 0 checks a quantity of to-be-forwarded data packets at the egress port 0; and if the quantity is greater than 5, sets an ECN field of the newly arrived data packet to 11; or if the quantity is less than or equal to 5, the transit switch does not change an ECN field of the newly arrived data packet. The ECN field of the data packet may be 01 or 10.

Because the transit switch in this application has an ECN function, a device receiving a data packet from the transit switch may learn of a status of the transit switch through an ECN field of the data packet: whether congestion is occurring.

(II) Switch Group

In this application, a switch group is a group of devices connected to network nodes and transit switches, and may be a POD in the fat-tree network shown in FIG. 1A, may be a leaf switch in the leaf-and-spine network shown in FIG. 1B, or may be a group of devices configured to connect to a network node and a transit switch in another hierarchical transmission network.

(III) Controller

In this application, each switch group is configured with a controller, and the controller is connected to and controls the switch group and network nodes corresponding to the switch group.

In this application, the controller may be configured to: obtain a data packet from each transit switch, determine a status of the transit switch, perform routing scheduling, and so on.

(IV) Network Node

In this application, the network node may be a device such as a work station, a server, or a terminal device that has a unique network address. In the data center network, any two network nodes connected to different switch groups need to communicate by using respectively connected switch groups and transit switches.

For example, as shown in FIG. 2, the network node 0 and a network node 2 are respectively connected to a switch group 0 and a switch group 1. When the network node 0 sends data to the network node 2, a transmission path of the data is: the network node 0-the switch group 0-any transit switch in the data center network-the switch group 1-the network node 2.

(V) Source Network Node and Destination Network Node

In this application, a network node sending data is referred to as a source network node, and a network node receiving data is referred to as a destination network node. When a plurality of network nodes send data to a same network node, there are a plurality of source network nodes and one destination network node.

Correspondingly, a switch group connected to the source network node is referred to as a source switch group, and a switch group connected to the destination network node is referred to as a destination switch group. In this application, a controller corresponding to the destination switch group is referred to as a first controller. As can be understood, the first controller is connected to and controls the destination switch group and the destination network node.

As can be understood, when a plurality of network nodes send data to a same network node, there are correspondingly a plurality of source switch groups and one destination switch group. For example, referring to FIG. 2, when network nodes 0, 1, 3, and 4 all send data to the network node 2, the source switch group includes the switch group 0, the switch group 2, and a switch group 3, and the destination switch group includes the switch group 1.

As can be understood, when a source network node sends data to a destination network node, a transmission path of the data is: the source network node-a source switch group connected to the source network node-a transit switch-a destination switch group connected to the destination network node-the destination network node.

The data center network provided in this application is described below in detail with reference to a fat-tree network and a leaf-and-spine network.

Figure 3A:
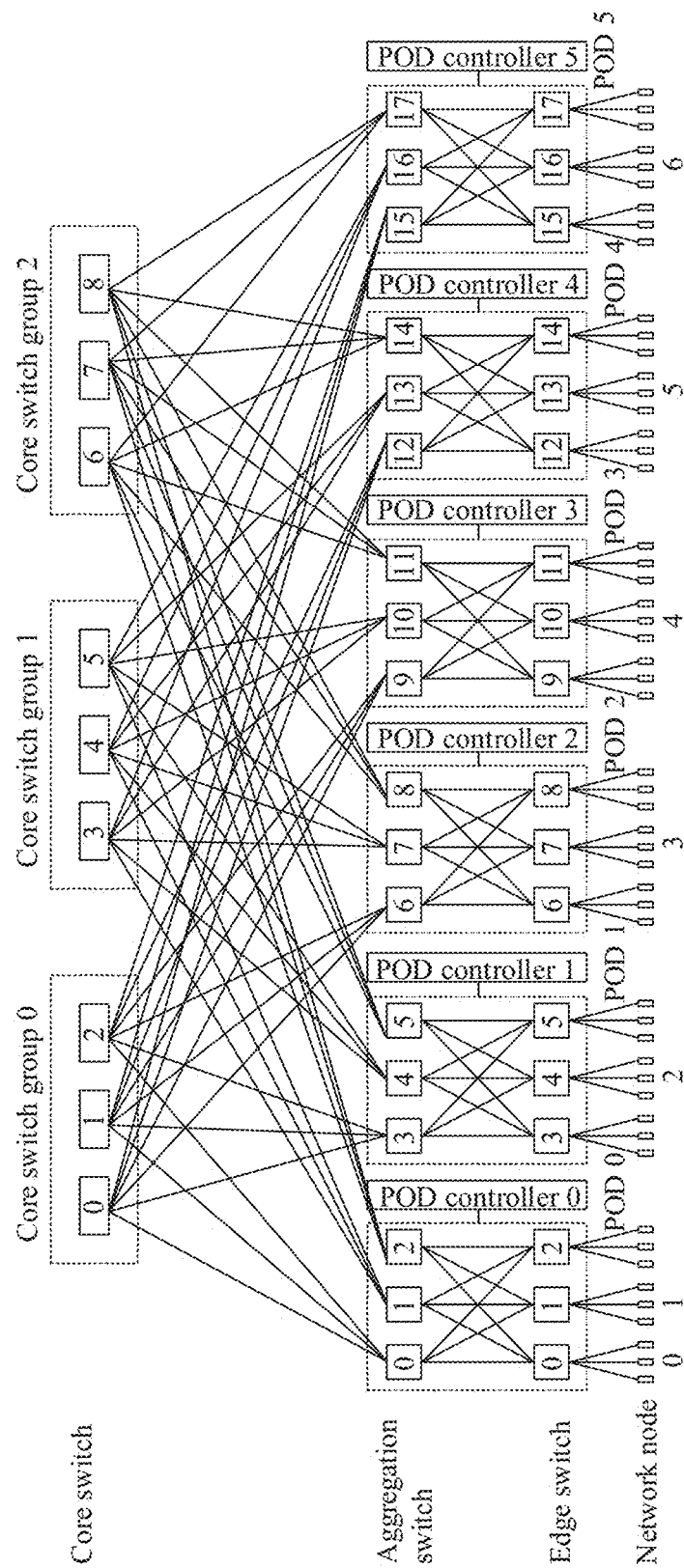
FIG. 3A is a schematic structural diagram of a fat-tree network according to this application.

FIG. 3A is a schematic structural diagram of a fat-tree network according to this application. In FIG. 3A, a fat-tree network having six elements is used as an example. Compared with the POD in FIG. 1A, in the fat-tree network shown in FIG. 3A, each POD is configured with a POD controller. In this application, the POD controller may be configured to: obtain a data packet from each core switch, read a value of an ECN field of each data packet, determine a status of the core switch, perform route scheduling, and so on.

Figure 3B:
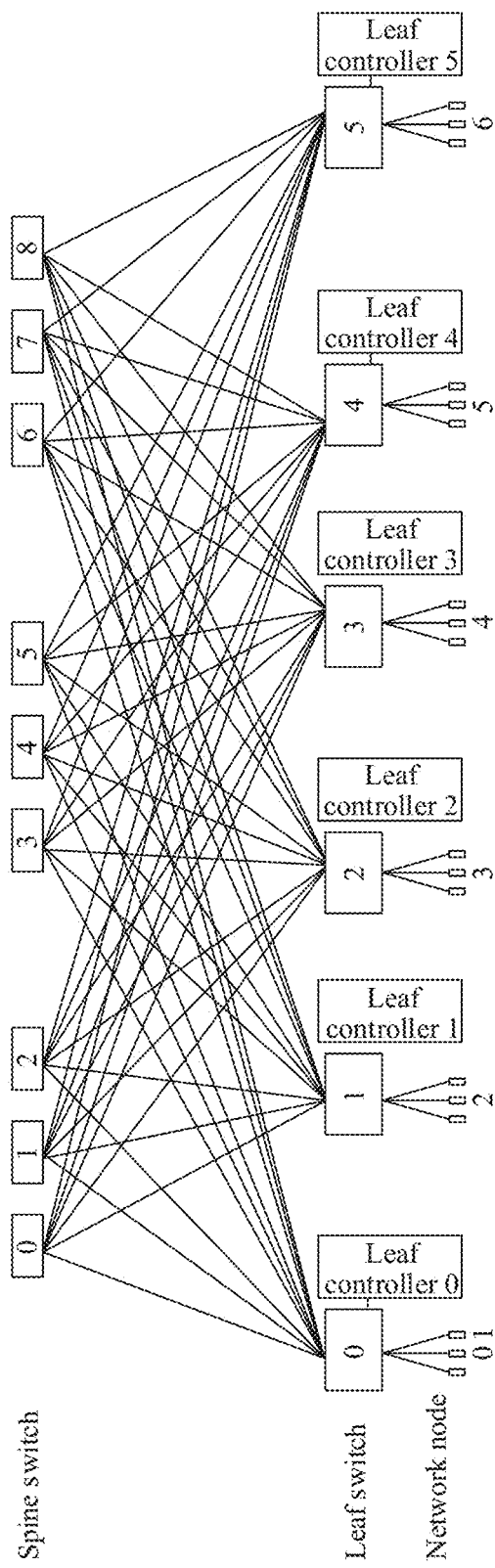
FIG. 3B is a schematic structural diagram of a leaf-and-spine network according to this application.

FIG. 3B is a schematic structural diagram of a leaf-and-spine network according to this application. Compared with the leaf switch in FIG. 1B, in the leaf-and-spine network shown in FIG. 3B, each leaf switch is configured with a leaf controller. In this application, the leaf controller may be configured to: obtain a data packet from each spine switch, read a value of an ECN field of each data packet, determine a status of the spine switch, perform route scheduling, and so on.

Based on the data center network in FIG. 2, FIG. 3A, and FIG. 3b, to balance load of each transit switch, reduce a data transmission delay, and improve a bandwidth resource utilization rate, this application provides a data transmission method.

A main inventive principle of this application may include: A first controller learns of a status of each transit switch in a data center network, determines, in available transit switches, available transit switches configured to respectively transit data from different source network nodes. Each available transit switch transits a balanced amount of data.

The following describes several basic concepts in this application.

(I) Available Transit Switch and Unavailable Transit Switch

In this application, for a destination network node, transit switches in the data center network may be divided into two types: available transit switches and unavailable transit switches.

As can be understood, each of the plurality of transit switches in the data center network has an egress port configured to forward data to the destination network node.

The available transit switch is a transit switch in which load of the egress port does not exceed the first threshold.

The unavailable transit switch is a transit switch in which load of the egress port exceeds the first threshold.

(II) A Group of Data

In this application, data that passes through a same source switch group during transmission is referred to as a group of data. That is, data sent by a source network node connected to a same source switch group to a destination network node connected to a destination switch group is referred to as a group of data. It can be understood that the group of data may be generated by one or more source network nodes connected to the source switch group.

The fat-tree network shown in FIG. 3A is used as an example for description. It is assumed that there are six source network nodes: a network node 0, a network node 1, a network node 2, a network node 4, a network node 5, and a network node 6, and correspondingly, there are five source PODs: a POD 0, a POD 1, a POD 3, a POD 4, and a POD 5; and there is one destination network node 3, and correspondingly, there is one destination POD: a POD 2. In the fat-tree network shown in FIG. 3A, there are five groups of data in total: data sent by the network node 0 and the network node 1 to the network node 3, data sent by the network node 2 to the network node 3, data sent by the network node 4 to the network node 3, data sent by the network node 5 to the network node 3, and data sent by the network node 6 to the network node 3.

It can be understood that one group of data may be transited by one transit switch, or may be transited by a plurality of transit switches together. For example, referring to FIG. 3A, assuming that a source POD is the POD 0, and a destination POD is the POD 2, a group of data passing through the POD 0 may be transited by a core switch group 0, or may be transited by a core switch group 0, a core switch group 1, and a core switch group 1 together. When a plurality of transit switches transit one group of data together, the plurality of transit switches may transit the same data, or may transit different parts of the group of data.

As can be understood, during transmission, a group of data may be transmitted in a form of data packets, and may be transmitted by multiple times. This is not limited in this application.

(III) Packing Sequence Group

In this application, one packing sequence group is determined based on three parameters V, K, and M. After values of V, K, and M are determined, a corresponding packing sequence group is constructed based on the following three conditions:

1. One packing sequence group includes M packing sequences.
2. Any one of the M packing sequences includes V elements. In an $i^{th}$ packing sequence, $K_i$ elements are set to a third value, where $0 \le i \le M$. In some embodiments of this application, $K_1 = K_2 = K_3 = \ldots = K_M = K$. To be specific, in V elements of any packing sequence, when V>K, K elements are set to the third value; and when V≤K, V elements are set to the third value.
3. In each of the M packing sequences, any element can be set to the third value for at most $[(K_1 + K_2 + K_3 + \ldots + K_M)/V]$ times.

The third value may be predefined. This is not limited in this application. For example, the third value may be 1.

As can be known from the foregoing three conditions, a packing sequence group has the following features: In M packing sequences of the packing sequence group, any element is set to the third value for at least once, and each element is set to the third value for an approximately same quantity of times.

Table 1 shows a possible implementation form of a packing sequence group. In the packing sequence group, V=6, $K_1 = K_2 = K_3 = \ldots = K_M = K = 3$, M=5, and the third value is 1.

TABLE 1

| Packing sequence group | |
|---|---|
| Packing sequence 1 | 110100 |
| Packing sequence 2 | 011010 |
| Packing sequence 3 | 001101 |
| Packing sequence 4 | 100110 |
| Packing sequence 5 | 010011 |

As shown in Table 1, the packing sequence group includes five packing sequences, and each packing sequence includes six elements.

In the packing sequence group, the first element is set to "1" for twice, the second element is set to "1" for three times, the third element is set to "1" for twice, the fourth element is set to "1" for three times, the fifth element is set to "1" for three times, and the sixth element is set to "1" for twice. As can be learned, any element is set to "1" for a balanced quantity of times.

As can be understood, when not all of $K_1, K_2, K_3, \ldots,$ and $K_M$ are equal, a corresponding packing sequence group can be constructed in some cases. In the constructed packing sequence group, each of V elements is set to the third value for a balanced quantity of times.

In this application, after values of V, $K_1, K_2, K_3, \ldots,$ and $K_M$, and M are determined, the corresponding packing sequence group can be constructed. The following uses an example in which $K_1=K_2=K_3=\ldots=K_M=K$ for description, to briefly describe a method for constructing the corresponding packing sequence group based on V, K, and M.

1. $\lambda_1$ is determined based on Formula 1, where $\lambda_1$ is a minimum value of $\lambda$ when Formula 1 is met:

$$\left\lfloor \frac{V}{K}\left\lfloor \frac{\lambda_1(V-1)}{K-1}\right\rfloor\right\rfloor \geq M \quad \text{Formula 1}$$

2. (V, K, $\lambda_1$)-packing is constructed.

(V, K, $\lambda_1$)-packing includes a plurality of blocks, each block is a set, and elements included in each block are selected from V specified elements.

(V, K, $\lambda_1$)-packing meets the following conditions: Each block includes K elements, and any two different elements are in at most $\lambda_1$ blocks at the same time.

Herein, after the first step, the constructed (V, K, $\lambda_1$)-packing includes at least M blocks.

3. M blocks are selected from the at least M blocks in (V, K, $\lambda_1$)-packing. Any of the V specified elements is in at most [MK/IV] blocks at the same time.

4. When V>K, the corresponding packing sequence group is generated based on the M selected blocks. Specifically, an $i^{th}$ block corresponds to an $i^{th}$ packing sequence in the packing sequence group. For a specific generation rule, refer to a subsequent related description.

When V≤K, the packing sequence group is directly generated. In M packing sequences, each element is set to the third value. For example, it is assumed that V=6, K=3, and M=5. The V specified elements are: 1, 2, 3, 4, 5, and 6.

First, it is determined based on Formula 1 that $\lambda_1=2$.

Second, (2, 3, 5)-packing is constructed, which includes ten blocks. (2, 3, 5)-packing may be: {{1, 2, 4}, {2, 3, 5}, {3, 4, 6}, {1, 4, 5}, {2, 5, 6}, {1, 3, 6}, {2, 3, 4}, {4, 5, 6}, {1, 2, 6}, {1, 3, 5}}.

Then, five blocks are selected from the ten blocks, so that each element is in at most [5×3÷6] blocks. The five blocks may be: {1, 2, 4}, {2, 3, 5}, {3, 4, 6}, {1, 4, 5}, {2, 5, 6}}.

Finally, V=6, K=3, V>K. and the corresponding packing sequence group is generated based on the five selected blocks. Referring to Table 1, the packing sequence group corresponding to the five blocks may be shown in Table 1. For example, the first block is (1, 2, 4), and elements 1, 2, and 4 are in the block. Correspondingly, the first, the second, and the fourth elements in the first packing sequence are set to the third value (1). To be specific, the first packing sequence is 110100.

Obviously, in the packing sequence group constructed based on the foregoing method, each element is set to the third value for a balanced quantity of times.

(IV) A Controller Stores a Plurality of Packing Sequence Groups

In this application, in a determined data center network, a quantity of transit switches, a quantity of switch groups, and a quantity of controllers are known. A plurality of controllers in the data center network each store a plurality of packing sequence groups based on the quantity of transit switches and the quantity of switch groups. It can be understood that packing sequences stored in the plurality of controllers in the data center network are the same. This is applicable to a scenario in which any controller is a destination controller.

The following uses an example in which the data center network includes A transit switches and B switch groups, to describe the plurality of packing sequence groups stored in the controller.

The controller constructs the packing sequence group based on three parameters: V, K, and M, where 1≤V≤A, 1≤K≤A, and 1≤M≤B. Therefore, the controller may construct and store A*A*B packing sequence groups.

For example, referring to the fat-tree network shown in FIG. 3A, the fat-tree network includes nine core switches (transit switches), six PODs (switch groups), and six controllers. The six controllers shown in FIG. 3A may construct and store 9*9*6=486 packing sequence groups based on 1≤V≤9, 1≤K≤9, and 1≤M≤6.

For example, the controller may store nine packing sequence groups when 1≤V≤9, K=3, and M=5. The nine packing sequence groups may be shown in Table 2. One row represents one packing sequence group. For example, when V=6, five corresponding packing sequences form one packing sequence group.

TABLE 2

| Nine packing sequence groups when 1 ≤ V ≤ 9, K = 3, and M = 5 | | | | | | | | |
|---|---|---|---|---|---|---|---|---|
| 1 | 2 | 3 | 4 | 5 | 6 | 7 | 8 | 9 |
| 1 | 11 | 111 | 1110 | 11010 | 110100 | 1010100 | 10010010 | 100100100 |
| 1 | 11 | 111 | 0111 | 01101 | 011010 | 1101000 | 01001001 | 010010010 |
| 1 | 11 | 111 | 1011 | 10110 | 001101 | 0011010 | 10100100 | 001001001 |
| 1 | 11 | 111 | 1101 | 10111 | 100110 | 0001101 | 01010100 | 100010001 |
| 1 | 11 | 111 | 1110 | 10101 | 010011 | 0100011 | 00101010 | 010001100 |

Similar to Table 2, the controller in this application may further construct and store the remaining part of the plurality of packing sequence groups when 1≤V≤9, 1≤K≤9, and 1≤M≤6.

The data transmission method in this application is described below. In this application, when data is transmitted in the data center network, the data is transmitted in a form of data packets by multiple times based on a data amount. During each time of transmission, data from source network nodes connected to a same source switch group may pass through different available transit switches.

In this application, data transmission may be divided into two stages: an initialization stage (the first transmission stage of a data packet) and a data transmission stage after initialization.

Figure 4:
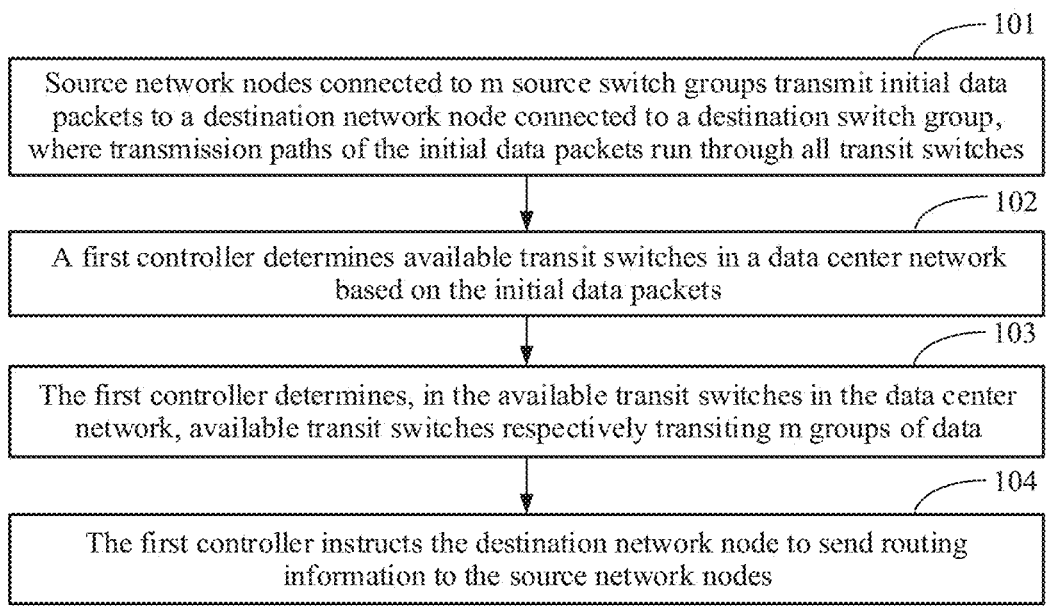
FIG. 4 is a schematic flowchart of an initialization stage in a data transmission method according to this application.

Referring to FIG. 4, an embodiment shown in FIG. 4 is described by using an example in which a data center network includes a plurality of transit switches, m source switch groups, one destination switch group, a plurality of source network nodes, and one destination network node, and m groups of data in total are transmitted.

FIG. 4 is a schematic flowchart of an initialization stage in the data transmission method provided in this application. The initialization stage can enable a first controller to learn of statuses of all transit switches in the data center network, and determine available transit switches.

The method may include the following steps.

S101. The source network nodes connected to the m source switch groups transmit initial data packets to the destination network node connected to the destination switch group, where transmission paths of the initial data packets run through all the transit switches in the data center network.

In an optional embodiment, when invoking data of the plurality of source network nodes in the data center network, the destination network node first sends a data transmission request to the plurality of source network nodes storing data.

Specifically, after receiving the data transmission request sent by the destination network node, the plurality of source network nodes first transmit the initial data packets. The initial data packets may be all data packets sent by the plurality of source network nodes to the destination network node during normal data transmission; or may be a small part of data packets in all data packets transmitted by the plurality of source network nodes to the destination network node. When a quantity of the initial data packets is relatively small, initialization efficiency may be accelerated.

As can be understood, the transmission paths of the initial data packets in step S101 is: the source network nodes-the source switch groups-the transit switches-the destination switch group-the destination network node.

In this application, the transmission paths of the initial data packets run through all the transit switches in the data center network. To enable the transmission paths of the initial data packets to run through all the transit switches in the data center network, there may be the following two policies:

In a first policy, when receiving an initial data packet from a source network node connected to each source switch group, the source switch group forwards the received initial data packet to all the transit switches. By using the first transmission policy, each source switch group simply traverses all the transit switches when forwarding the initial data packet, which is simple and easy to implement, and can ensure that the transmission paths of the initial data packets run through all the transit switches.

In a second policy, when receiving initial data packets from source network nodes connected to a plurality of source switch groups, the plurality of source switch groups forward the respective initial data packets to some different transit switches. A transit switch for each source switch group to forward an initial data packet may be pre-specified, or may be specified by the first controller and are carried in the data transmission request sent by the destination network node to the plurality of source network nodes.

For example, referring to FIG. 2, it is assumed that there are nine transit switches, three source switch groups: switch groups 0, 1, and 2, and one destination switch group 3 in total. In the second policy, the source switch group 0 may separately forward a received initial data packet to transit switches 0, 1, and 2: the source switch group 1 may separately forward a received initial data packet to transit switches 3, 4, and 5: and the source switch group 2 may separately forward a received initial data packet to transit switches 6, 7, and 8.

By using the second policy, each source switch group only needs to forward the initial data packet to some transit switches, to enable the transmission paths of the initial data packets to cover all the transit switches, thereby saving bandwidth resources.

As can be understood, the transit switch in this application has an ECN function. When receiving a data packet, the transit switch changes an ECN field of the data packet based on load of an egress port currently forwarding data to the destination network node. For details, refer to the detailed description about the transit switches in the data center network shown in FIG. 2.

S102. The first controller determines available transit switches in the data center network based on the initial data packets.

Specifically, the first controller is connected to and controls the destination switch group and the destination network node. When the initial data packets arrive at the destination switch group or the destination network node, the first controller can obtain the initial data packets.

Because in step S101, the initial data packets traverse all the transit switches, the first controller can obtain the initial data packet forwarded by each transit switch, learn of the statuses of all the transit switches in the data center network based on ECN fields of the initial data packets, and determine the available transit switches and unavailable transit switches. For a method for determining the available transit switches based on the ECN fields of the initial data packets, refer to the detailed description about the transit switches in the data center network shown in FIG. 2. Details are not described herein again.

In an optional embodiment, after determining the currently unavailable transit switches, the first controller sets statuses of the unavailable transit switches to available after preset duration. For a function of such a setting, refer to a detailed description in the embodiment shown in FIG. 5. Details are not described herein.

S103. The first controller determines, in the available transit switches in the data center network, available transit switches respectively transiting m groups of data. The m groups of data are data transmitted by the source network nodes connected to the m source switch groups to the destination network node connected to the destination switch group. One available transit switch is configured to transit at least one group of the data, and a difference between quantities of groups of the data transited by any two available transit switches does not exceed a second threshold.

Specifically, after determining the available transit switches in the data center network, the first controller may determine the available transit switches respectively transiting the m groups of data in second data transmission after initialization. In addition, one available transit switch is enabled to transit at least one group of the data, and the difference between quantities of groups of the data transited by any two available transit switches does not exceed the second threshold. The second threshold may be predefined. For example, the second threshold may be 1 or 2.

In this way, in the second data transmission, each available transit switch in the data center network is used, and a difference between amounts of data carried by every two available transit switches is within a specific range, thereby ensuring load balancing of the available transit switch.

In this application, the first controller may determine, in the following two cases, the available transit switches respectively transiting the m groups of data:

(1) Each group of data is transited by k available transit switches.

In an optional embodiment, to ensure that the difference between quantities of groups of the data transited by any two available transit switches does not exceed the second threshold, when the first controller determines the available transit switches respectively transiting the m groups of data, a quantity of groups of the data transited by any available transit switch may be made not exceed [mk/v], where k is a quantity that is of available transit switches transiting one group of the data and that is determined by the first controller. A specific value of k is determined by the first controller based on a transmission rate required by an application that currently triggers the m groups of data to be transmitted from the plurality of source network nodes to the destination network node. For example, when a higher transmission rate required by the application indicates a larger value of k. As can be understood, each of the k available transit switches transiting one group of the data may transit the entire group of the data, or may transit a different part of the group of the data. Optionally, when each of the k transit switches transits a different part of the group of the data, the group of the data may be averagely divided into k parts, each transit switch transfers one part of the data, and therefore, workload of the k transit switches may be averaged.

In another optional embodiment, to ensure that one available transit switch is configured to transit at least one group of the data, and the difference between quantities of groups of the data transited by any two available transit switches does not exceed the second threshold, the first controller may select a corresponding packing sequence group from a plurality of prestored packing sequence groups, and determine, based on packing sequences in the packing sequence group, the available transit switches respectively transiting the m groups of data. Details are as follows:

1. First, the first controller determines values of V, K, and M based on a quantity of available transit switches, a quantity of available transit switches transiting one group of data, and a quantity of source switch groups, and selects one corresponding packing sequence group from the plurality of prestored packing sequence groups based on V, K. and M.

Specifically, the value of V is the quantity v of available transit switches, the value of K is the quantity k of available transit switches transiting one group of the data, and the value of M is the quantity m of source switch groups.

For the description about prestoring the plurality of packing sequence groups by the first controller, refer to the related description about storing the plurality of packing sequence groups by the controller in the concept (IV) in this application.

2. The available transit switches respectively transiting the m groups of data are determined based on the selected packing sequence group.

Specifically, the selected packing sequence group includes m packing sequences. One source switch group corresponds to one packing sequence. Any packing sequence includes v elements, and the v elements respectively correspond to v available transit switches in the data center network: and when a value of an element is the third value, an available transit switch corresponding to the element is a transit switch transiting the data transmitted by the one or more source network nodes connected to the source switch groups to the destination network node connected to the destination switch group.

For example, it is assumed that the data center network shown in FIG. 2 includes six source network nodes: network nodes 0, 1, 2, 4, 5, and 6, and the destination network node is a network node 3. That is, the data center network includes five source switch groups: a switch group 0, a switch group 1, a switch group 3, a switch group 4, and a switch group 5, and the destination switch group is a switch group 2. The first controller is a controller 2. It is assumed that there are six available transit switches determined by the first controller: transit switches 0, 1, 2, 6, 7, and 8.

It is assumed that the quantity of available transit switches transiting one group of the data is 3, and the third value is 1. That is, v=6, k=3, and m=5. The first controller may find one corresponding packing sequence group in the plurality of prestored packing sequence groups based on V=6, K=3, and M=5.

Optionally, the packing sequence group may be shown in Table 1, where packing sequences 1 to 5 respectively correspond to five source switch groups. The first source switch group corresponds to the packing sequence 1 (110100), indicating that data sent by the network nodes 0 and 1 to the network node 3 is transited by the first, second, and fourth available transit switches (the transit switches 0, 1, and 6). Meanings of other packing sequences may be deduced by analogy, and details are not described herein.

(2) Each group of data may be transited by a different quantity of available transit switches.

Specifically, an it group of data (that is, data transmitted by a source network node connected to an $i^t$ source switch group to the destination network node connected to the destination switch group) may be transited by $k_i$ available transit switches, where $1 \le i \le m$. A value of $k_i$ is determined by the first controller. In a possible implementation, data from each source POD may have a different priority. Data with a higher priority may be transited by a larger quantity of available transit switches, that is, a value of $k_i$ corresponding to this group of data is larger.

In an optional embodiment, to ensure that the difference between quantities of groups of the data transited by any two available transit switches does not exceed the second threshold, when the first controller determines the available transit switches respectively transiting the m groups of data, a quantity of groups of the data transited by any available transit switch may be made not exceed $[(k_1+k_2+ \ldots +k_m)/v]$.

In another optional embodiment, to ensure that one available transit switch is configured to transit at least one group of the data, and the difference between quantities of groups of the data transited by any two available transit switches does not exceed the second threshold, the first controller may select a corresponding packing sequence group from a plurality of prestored packing sequence groups, and determine, based on packing sequences in the packing sequence group, the available transit switches respectively transiting the m groups of data. The packing sequence group may be constructed and stored in the first controller based on values of V, $K_1$, $K_2$, $K_3$, . . . , and $K_M$, and M. For a construction process of the packing sequence, refer to the related the description about the packing sequence group in the concept (III) in this application. The value of V is the quantity v of available transit switches, the value of K is the quantity k of available transit switches transiting one group of the data, and the value of M is the quantity m of source switch groups, where $K_1=k_1$, $K_2=k_2$, . . . , and $K_M=k_m$. As can be understood, for a process in which the first controller determines, based on the packing sequences in the packing sequence group, the available transit switches respectively transiting the m groups of data, refer to step 2, in the foregoing policy (1). Details are not described herein again.

As can be known from the foregoing two cases of (1) and (2), this application is not only applicable to a case in which data in each source POD is transited by a same quantity of available transit switches, but also applicable to a case in which data in each source POD is transited by a different quantity of available transit switches.

S104. The first controller instructs the destination network node to send routing information to the source network node, where the routing information includes an identifier of an available transit switch configured to transit a data group transmitted by the source network node to the destination network node.

Specifically, after determining the available transit switches respectively transiting the m groups of data, the first controller instructs the destination network node to send, to a corresponding source network node, the identifier of the available transit switch transiting each group of data. For example, using the example in step S103 for description, the first controller may instruct the destination network node to send identifiers of the transit switches 0, 1, and 6 to the network nodes 0 and 1. The identifier of the available transit switch may be an identifier that may be used to uniquely determine the transit switch in the data center network, such as a MAC address or a switch virtual interface (switch virtual interface, SVI) address.

In an optional embodiment, the routing information may be carried in an acknowledgement signal (acknowledgement, ACK) sent by the destination network node to each source network node after the destination network node receives an initial data packet.

Figure 5:
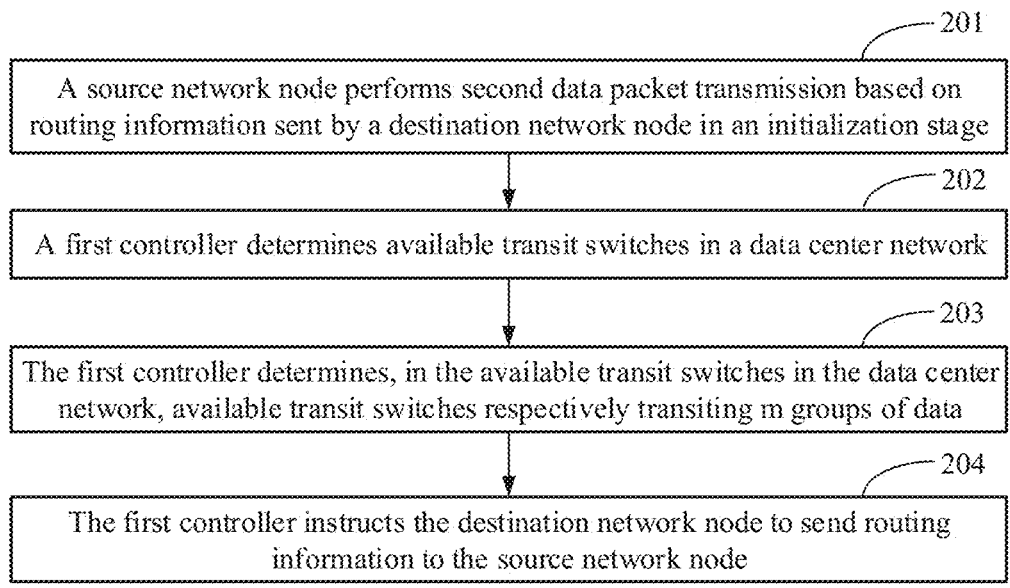
FIG. 5 is a schematic flowchart of a data transmission method after initialization according to this application.

By using the method embodiment shown in FIG. 4, the first data packet transmission, that is, the initialization stage, is completed. FIG. 5 is a schematic flowchart of a data transmission stage after initialization. In FIG. 5, an example in which a source network node receives routing information sent by a destination network node and performs second data packet transmission based on the routing information is used for description. The following steps may be included.

S201. The source network node performs the second data packet transmission based on the routing information sent by the destination network node in an initialization stage.

Specifically, a plurality of source network nodes in the data center receive the routing information sent by the destination network node, and uniquely determine a data packet transmission path for the current transmission based on an identifier of an available transit switch in the routing information.

An example in step S103 in the embodiment shown in FIG. 4 is used, and the network nodes 0 and 1 receive the routing information sent by the network node 3, where the routing information includes identifiers of the transit switches 0, 1, and 6. The network node 0 may determine three paths in the current data packet transmission, each path includes an uplink path and a downlink path, and the three paths are as follows:

path 1, an uplink path: the network node 0-the switch group 0-the transit switch 0; and a downlink path: the transit switch 0-the switch group 2-the network node 3;

path 2, an uplink path: the network node 0-the switch group 0-the transit switch 1; and a downlink path: the transit switch 1-the switch group 2-the network node 3; and path 3, an uplink path: the network node 0-the switch group 0-the transit switch 6: and a downlink path: the transit switch 6-the switch group 2-the network node 3.

Similarly, during the second data packet transmission, a path for another source network node may be deduced by analogy.

The specific paths in the second data transmission are described below with reference to a fat-tree network and a leaf-and-spine network.

Referring to FIG. 3A, when the data center network is a fat-tree network, the network node 0 may determine three paths in the current data packet transmission, each path includes an uplink path and a downlink path, and the three paths are as follows:

path 1, an uplink path: the network node 0-the edge switch 0-the aggregation switch 0-the core switch 0; and a downlink path: the core switch 0-the aggregation switch 6-the edge switch 7-the network node 3;

path 2, an uplink path: the network node 0-the edge switch 0-the aggregation switch 0-the core switch 1: and a downlink path: the core switch 1-the aggregation switch 6-the edge switch 7-the network node 3; and path 3, an uplink path: the network node 0-the edge switch 0-the aggregation switch 2-the core switch 6; and a downlink path: the core switch 6-the aggregation switch 8-the edge switch 7-the network node 3.

Referring to FIG. 3B, when the data center network is a leaf-and-spine network, the network node 0 may determine three paths in the current data packet transmission, each path includes an uplink path and a downlink path, and the three paths are as follows:

path 1, an uplink path: the network node 0-the leaf switch 0-the spine switch 0: and a downlink path: the spine switch 0-the leaf switch 2-the network node 3;

path 2, an uplink path: the network node 0-the leaf switch 0-the spine switch 1; and a downlink path: the spine switch 1-the leaf switch 2-the network node 3: and path 3, an uplink path: the network node 0-the leaf switch 0-the spine switch 6; and a downlink path: the spine switch 6-the leaf switch 2-the network node 3.

S202. The first controller determines available transit switches in the data center network.

Specifically, during the second data packet transmission, a plurality of source network nodes transmit data by using the available transit switch selected by the first controller in the initialization stage. It can be understood that the first controller can obtain a data packet transmitted for the second time, and determine, based on the data packet transmitted for the second time, a status of the available transit switch selected by the first controller in the initialization stage.

Using the example in step S103 in the embodiment shown in FIG. 4 for description, referring to FIG. 2, it is assumed that there are six available transit switches determined by the first controller in the initialization stage: transit switches 0, 1, 2, 6, 7, and 8. Therefore, in step S202, the first controller can learn of statuses of the six transit switches, and re-determine an available transit switch in the six transit switches for the second data packet transmission.

Apparently, in the second data packet transmission, the first controller cannot learn of, by using a data packet, statuses of transit switches (transit switches 3, 4, and 5) that have not transited data in the second data packet transmission.

In this application, valid duration of an unavailable transit switch is set, to avoid the following case: After some transit switches are considered unavailable, even if actual statuses of the transit switches change to available in subsequent data transmission, the first controller cannot transit data by using the transit switches because the first controller cannot learn of the statuses of the transit switches. In this way, a waste of bandwidth resources can be avoided. The preset duration may be determined based on a speed at which the transit switch forwards data. Optionally, a higher data forwarding speed of the transit switch indicates shorter preset duration.

Using the foregoing example for description, in the initialization stage, the first controller learns that the transit switches 3, 4, and 5 are unavailable transit switches, and therefore, does not use the transit switches 3, 4, and 5 in the second data transmission after the initialization stage. During the second data transmission, the first controller cannot learn of the statuses of the transit switches 3, 4, and 5 by using data packets.

The transit switches 3, 4, and 5 are unavailable in the initialization stage, and may become available in the second data transmission. Therefore, to prevent the first controller from always considering that the transit switches 3, 4, and 5 are unavailable, in this application, in the previous data transmission (that is, the initialization stage), when the first controller obtains that the transit switches 3, 4, and 5 are unavailable, the first controller sets preset duration. After the preset duration, the first controller considers that the transit switches 3, 4, and 5 are available.

If the first controller obtains, in the initialization stage, that the transit switches 3, 4, and 5 are unavailable, and duration from obtaining the statuses to determining available transit switches in the data center network by the first controller in step S202 already exceeds the preset duration, the first controller considers that the transit switches 3, 4, and 5 are available.

As can be known through step S202, in the second data transmission, the available transit switches determined by the first controller include an available transit switch determined by using an ECN field of a data packet and an available transit switch determined by using the preset duration.

S203. The first controller determines, in the available transit switches in the data center network, available transit switches respectively transiting m groups of data.

S204. The first controller instructs the destination network node to send routing information to the source network node, where the routing information includes an identifier of an available transit switch configured to transit a data group transmitted by the source network node to the destination network node.

The routing information in step S204 is used by each source network node to determine a path in third data transmission.

It can be understood that implementation of steps S203 and S204 is similar to implementation of steps S103 and S104 in the embodiment in FIG. 4. For details, refer to the related description. Details are not described herein again.

It can be understood that after the second data transmission, there are a plurality of times of data transmission until transmission of the m groups of data is completed. Steps of the plurality of times of subsequent data transmission are the same as the steps of the second data transmission shown in FIG. 5. For details, refer to the related description. Details are not described herein again.

According to the method embodiments shown in FIG. 4 and FIG. 5, the first controller may determine an available transit switch in each time of data transmission, find the corresponding packing sequence group in the plurality of prestored packing sequence groups, and determine, based on the packing sequence group, the available transit switches respectively transiting the m groups of data.

Herein, when the first controller determines the available transit switches respectively transiting the m groups of data, the unavailable transit switches are excluded, and a transit switch with large load is not used, thereby avoiding further increasing load of these transit switches. This is equivalent to performing first load balancing.

When the first controller determines the available transit switches respectively transiting the m groups of data, each available transit switch has been used, and each available transit switch bears an approximately same amount of data. This is equivalent to performing second load balancing on all available transit switches.

In conclusion, according to the data transmission method in this application, computational complexity is low, efficiency is high, excessively large load of some transit switches can be avoided, load of each transit switch in the data center network is balanced, a bandwidth resource utilization rate is improved, and a transmission delay is reduced.

The data transmission method in this application is described in detail above. For ease of better implementing the foregoing method in this application, a related apparatus in this application is correspondingly provided below.

Figure 6:
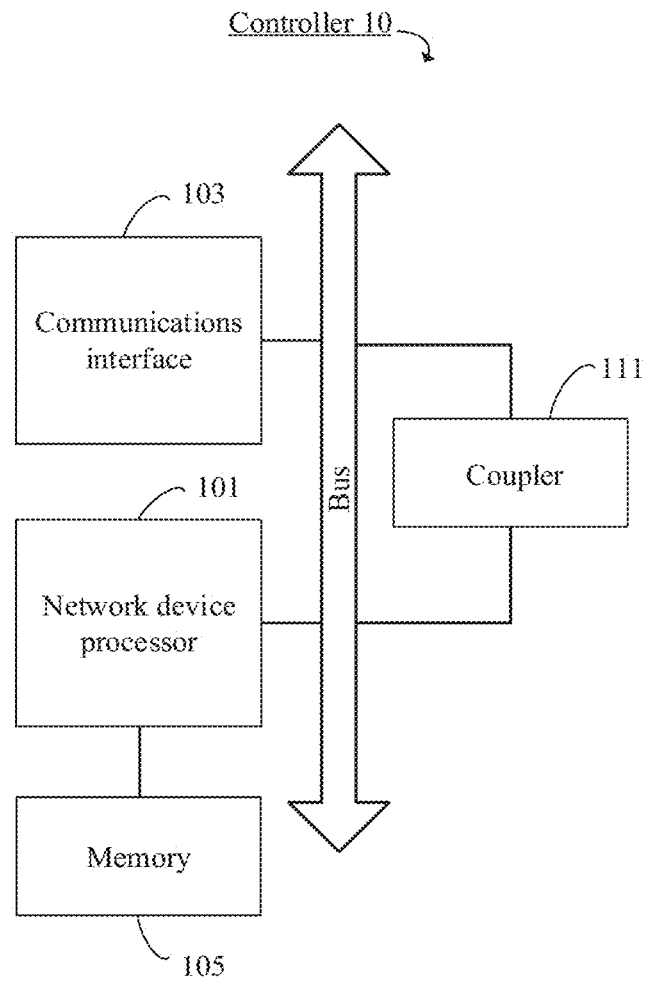
FIG. 6 is a schematic structural diagram of a controller according to this application.

FIG. 6 is a schematic structural diagram of a controller 10 according to this application. The controller 10 may be implemented as the controller in the data center network shown in FIG. 2, may be the POD controller in the fat-tree network shown in FIG. 3A or the leaf controller in the leaf-and-spine network shown in FIG. 3B, or may be the controller in the foregoing method embodiments. As shown in FIG. 6, the controller 10 may include: a communications interface 103, one or more controller processors 101, a coupler 111, and a memory 105. These components may be connected by using a bus or in other manners. In FIG. 6, an example in which a bus is used for connection is used.

The communications interface 103 may be used by the controller 10 to communicate with other devices, for example, the switch group and the network node in FIG. 2, the aggregation switch, the edge switch, and the network node in FIG. 3A, and the leaf switch, the network node in FIG. 3B. During specific implementation, the communications interface 103 may be a wired communications interface (for example, an Ethernet interface).

The memory 105 is coupled to the controller processor 101, and is configured to store various software programs and/or a plurality of groups of instructions. During specific implementation, the memory 105 may include a high-speed random access memory, and may include a non-volatile memory, for example, one or more magnetic disk storage devices, flash memory devices, or other non-volatile solid-state storage devices. The memory 105 may store an operating system, for example, an embedded operating system such as uCOS, VxWorks, or RTLinux. In this application, for the description about prestoring a plurality of packing sequence groups by the memory 105, refer to the related description about storing the plurality of packing sequence groups by the controller in the concept (IV) in this application.

In some embodiments of this application, the memory 105 may be configured to store a program for implementing the data transmission method provided in one or more embodiments of this application on the controller 10 side. For implementation of the data transmission method provided in one or more embodiments of this application, refer to the method embodiments shown in FIG. 4 and FIG. 5.

The controller processor 101 may be a general purpose processor, for example, a central processing unit (central processing unit, CPU). The processor 101 may further include a hardware chip. The hardware chip may be a combination of one or more of the following: an application-specific integrated circuit (application-specific integrated circuit, ASIC), a field programmable gate array (field programmable gate array, FPGA), and a complex programmable logic device (complex programmable logic device, CPLD). The processor 101 may process received data. In this application, the processor 601 may further determine available transit switches in a data center network based on the received data, and determine a transit switch transiting data sent by each source network node.

In this embodiment of the present invention, the controller processor 101 may be configured to read and execute a computer-readable instruction. Specifically, the controller processor 101 may be configured to: invoke a program stored in the memory 105, for example, the program for implementing the data transmission method provided in one or more embodiments of this application on the controller 10 side, and execute an instruction included in the program.

It should be noted that the controller 10 shown in FIG. 6 is merely an implementation of this embodiment of the present invention. During actual implementation, the controller 10 may include more or fewer components. This is not limited herein.

Figure 7:
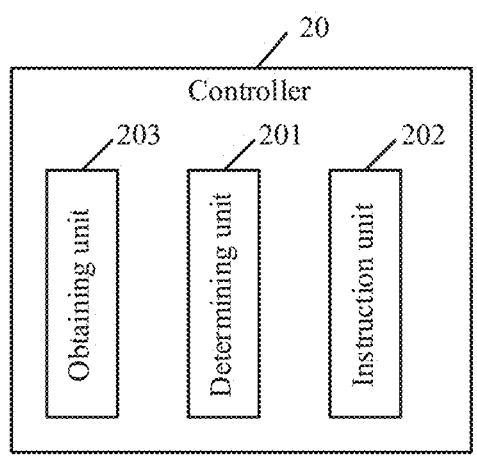
FIG. 7 is a functional block diagram of a controller according to this application.

FIG. 7 is a functional block diagram of a controller 20 according to this application.

As shown in FIG. 7, the controller 20 may include a determining unit 201 and an instruction unit 202.

The determine unit 201 is configured to determine, in available transit switches in a data center network, available transit switches respectively transiting m groups of data, where the m groups of data are data transmitted by one or more source network nodes connected to m source switch groups to a destination network node connected to a destination switch group; the data center network includes a plurality of transit switches, the m source switch groups, the destination switch group, the one or more source network nodes, and the destination network node: the available transit switch is a transit switch that is in the plurality of transit switches and whose load does not exceed a first threshold; and m is a positive integer.

One available transit switch is configured to transit at least one group of the data, and a difference between quantities of groups of the data transited by any two available transit switches does not exceed a second threshold.

The instruction unit 202 is configured to instruct the destination network node to send routing information to the source network node, where the routing information includes an identifier of an available transit switch configured to transit a data group transmitted by the source network node to the destination network node.

In an optional embodiment, the controller 20 further includes an obtaining unit 203, configured to obtain at least one data packet. The determining unit 201 is further configured to: when a value of a congestion display indication field in the data packet is a first value, determine that a transit switch sending the data packet is the available transit switch: or when a value of a congestion display indication field in the data packet is a second value, determine that a transit switch sending the data packet is the available transit switch after preset duration.

In an optional embodiment, the at least one data packet is from the plurality of transit switches, or the at least one data packet is from an available transit switch in previous data transmission.

In an optional embodiment, to ensure that the difference between quantities of groups of the data transited by any two available transit switches does not exceed the second threshold, a quantity of groups of the data transited by any available transit switch determined by the first controller does not exceed [mk/v], where k is a quantity of available transit switches transiting one group of the data.

In an optional embodiment, the determining unit 201 determines, based on a packing sequence, the transit switches respectively transiting the m groups of data. Specifically, the determining unit 201 determines, in a plurality of prestored packing sequence groups, packing sequences respectively corresponding to the m source switch groups, where one source switch group corresponds to one packing sequence, the packing sequence includes v elements, and the v elements respectively correspond to v available transit switches in the data center network: and when a value of an element is a third value, an available transit switch corresponding to the element is a transit switch transiting the data transmitted by the one or more source network nodes connected to the source switch groups to the destination network node connected to the destination switch group, where when $v>k$, there are k elements set to the third value in the v elements, and when $v \leq k$, the v elements are set to the third value, where one packing sequence group includes m packing sequences, and in each of the plurality of packing sequence groups, any element is set to the third value for at least once, and is set to the third value for at most [mk/v] times; and v is the quantity of the available transit switches, and k is the quantity of the available transit switches that transit one group of the data.

In an optional embodiment, the routing information is carried in an acknowledgement signal.

In an optional embodiment, the data center network is a fat-tree network, or the data center network is a leaf-and-spine network.

As can be understood, for specific implementation of the functional units included in the controller 20, refer to FIG. 4 and FIG. 5 and the related descriptions. Details are not described herein again.

In addition, this application further provides a data center network. The data center network may be the network shown in FIG. 2, FIG. 3A or FIG. 3B, and may include a transit switch, a switch group, a network node, and a controller. The controller may be the first controller in the method embodiments respectively corresponding to FIG. 4 and FIG. 5.

During specific implementation, the controller may be the controller in the center network shown in FIG. 2, may be the POD controller in the fat-tree network shown in FIG. 3A, or may be the leaf controller in the leaf-and-spine network shown in FIG. 3B.

During specific implementation, the controller may be the controller shown in FIG. 6 or FIG. 7.

In conclusion, implementation of this application can balance load of each transit switch in the data center network, improve a bandwidth resource utilization rate, and reduce a transmission delay.

All or some of the foregoing embodiments may be implemented by using software, hardware, firmware, or any combination thereof. When being implemented by using software, all or some of the embodiments may be implemented in a form of a computer program product. The computer program product includes one or more computer instructions. When the computer program instruction is loaded and executed on a computer, the procedures or functions according to this application are all or partially generated. The computer may be a general purpose computer, a special-purpose computer, a computer network, or another programmable apparatus. The computer instruction may be stored in a computer-readable storage medium, or may be transmitted from one computer-readable storage medium to another computer-readable storage medium. For example, the computer instruction may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any available medium accessible to the computer, or a data storage device, such as a server or a data center integrating one or more available media. The available medium may be a magnetic medium (for example, a floppy disk, a hard disk, or a magnetic tape), an optical medium (for example, a DVD), a semiconductor medium (for example, a solid-state disk), or the like.

What is claimed is:

1. A data transmission method, comprising:
selecting, by a first controller, transit switches for respectively transiting m groups of data, from available transit switches in a data center network according to m packing sequences, wherein the m groups of data are data transmitted by one or more source network nodes connected to m source switch groups to a destination network node connected to a destination switch group; wherein the data center network comprises a plurality of transit switches, the m source switch groups, the destination switch group, the one or more source network nodes, and the destination network node; wherein each available transit switch is a transit switch that is in the plurality of transit switches and whose load does not exceed a first threshold; wherein the m packing sequences respectively correspond to the m source switch groups, each packing sequence comprises v elements with each element corresponding to an available transit switch, and wherein m is a positive integer and v is a quantity of the available transit switches, and wherein
a selected transit switch is configured to transit at least one group of data in the m groups of data, and a difference between quantities of groups of the data transited by any two selected transit switches does not exceed a second threshold; and
instructing, by the first controller, the destination network node to send routing information to the one or more source network nodes, wherein the routing information comprises an identifier of the selected transit switch configured to transit the at least one group of data in the m groups of data transmitted by the one or more source network nodes to the destination network node.

2. The method according to claim 1, wherein before selecting, by the first controller, the suitable transit switches for respectively transiting the m groups of data, from the available transit switches in the data center network according to the packing sequences, the method further comprises:
obtaining, by the first controller, at least one data packet sent by a transit switch;
when a value of a congestion display indication field in the at least one data packet is a first value, determining that the transit switch sending the at least one data packet is a suitable transit switch; or
when a value of a congestion display indication field in the at least one data packet is a second value, determining that the transit switch sending the at least one data packet is a suitable transit switch after a preset duration.

3. The method according to claim 2, wherein the at least one data packet is from the plurality of transit switches, or the at least one data packet is from an available transit switch in data previously transmitted.

4. The method according to claim 1, wherein that the difference between the quantities of groups of the data transited by any two selected transit switches does not exceed a second threshold comprises:
a quantity of groups of the data transited by any selected transit switch does not exceed [mk/v], wherein
k is a quantity of the selected transit switches for transiting at least one group of data in the m groups of data.

5. The method according to claim 1, wherein the selecting, by a first controller in available transit switches in a data center network, suitable transit switches for respectively transiting m groups of data comprises:
determining, by the first controller, the m packing sequences according to a plurality of prestored packing sequence groups, wherein one source switch group corresponds to one packing sequence; and when a value of an element is a third value, an available transit switch corresponding to the element is selected to transit at least one group of data in the m groups of data transmitted by the one or more source network nodes connected to the m source switch groups to the destination network node connected to the destination switch group, wherein
when v>k, there are k elements set to the third value in the v elements, and when v≤k,
the v elements are set to the third value, wherein k is the quantity of the suitable transit switches selected by the first controller for transiting at least one group of the m groups of data.

6. The method according to claim 1, wherein the routing information is carried in an acknowledgement signal.

7. The method according to claim 1, wherein
the data center network is a fat-tree network having n basic switching units, a quantity of the plurality of transit switches is $n^2/4$, and every n/2 transit switches form one transit switch group; and
any one of the m source switch groups and the destination switch group comprises n/2 aggregation switches and n/2 edge switches, wherein
the n/2 aggregation switches are respectively connected to the n/2 edge switches;
the n/2 aggregation switches are respectively connected to n/2 transit switches in different transit switch groups; and
the n/2 edge switches are respectively connected to different network nodes.

8. The method according to claim 1, wherein
the data center network is a leaf-and-spine network, and any one of the m source switch groups and the destination switch group comprises one edge switch, wherein
the edge switch is connected to the plurality of transit switches, and different edge switches are respectively connected to different network nodes.

9. A controller, comprising a memory and a processor coupled to the memory, wherein the memory stores program code, and when the program code is executed by the processor, the controller is configured to:
select, in available transit switches in a data center network, suitable transit switches for respectively transiting m groups of data according to m packing sequences, wherein the m groups of data are data transmitted by one or more source network nodes connected to m source switch groups to a destination network node connected to a destination switch group; wherein the data center network comprises a plurality of transit switches, the m source switch groups, the destination switch group, the one or more source network nodes, and the destination network node; wherein each available transit switch is a transit switch that is in the plurality of transit switches and whose load does not exceed a first threshold; wherein the m packing sequences respectively correspond to the m source switch groups, each packing sequence comprises v elements with each element corresponding to an available transit switch, and wherein m is a positive integer and v is a quantity of the available transit switches, and wherein a selected transit switch is configured to transit at least one group of data in the m groups of data, and a difference between quantities of groups of data transited by any two available transit switches does not exceed a second threshold; and the controller is configured to instruct the destination network node to send routing information to the one or more source network nodes, wherein the routing information comprises an identifier of the selected transit switch configured to transit the at least one group of data in the m groups of data transmitted by the one or more source network nodes to the destination network node.

10. The controller according to claim 9, wherein when the program code is executed by the processor, the controller is further configured to:

obtain at least one data packet sent by a transit switch; and when a value of a congestion display indication field in the at least one data packet is a first value, determine that the transit switch sending the at least one data packet is a suitable transit switch; or when a value of a congestion display indication field in the at least one data packet is a second value, determine that the transit switch sending the at least one data packet is a suitable transit switch after a preset duration.

11. The controller according to claim 10, wherein the at least one data packet is from the plurality of transit switches, or the at least one data packet is from an available transit switch in data previously transmitted.

12. The controller according to claim 9, wherein that a difference between quantities of groups of the data transited by any two selected transit switches does not exceed a second threshold comprises:

a quantity of groups of the data transited by any available transit switch does not exceed [mk/v], wherein k is a quantity of the selected transit switches for transiting at least one group of data in the m groups of data.

13. The controller according to claim 9, wherein when the program code is executed by the processor, the controller is further configured to:

determine the m packing sequences according to a plurality of prestored packing sequence groups, wherein one source switch group corresponds to one packing sequence; and when a value of an element is a third value, an available transit switch corresponding to the element is a selected transit switch to transit at least one group of data in the m groups of data transmitted by the one or more source network nodes connected to the m source switch groups to the destination network node connected to the destination switch group, wherein when v>k, there are k elements set to the third value in the v elements, and when v≤k, the v elements are set to the third value, wherein k is the quantity of the selected transit switches for transiting at least one group of the m groups of data.

14. The controller according to claim 9, wherein the routing information is carried in an acknowledgement signal.

15. The controller according to claim 9, wherein the data center network is a fat-tree network having n basic switching units, a quantity of the plurality of transit switches is $n^2/4$, and every n/2 transit switches form one transit switch group; and any one of the m source switch groups and the destination switch group comprises n/2 aggregation switches and n/2 edge switches, wherein the n/2 aggregation switches are respectively connected to the n/2 edge switches;

the n/2 aggregation switches are respectively connected to n/2 transit switches in different transit switch groups; and the n/2 edge switches are respectively connected to different network nodes.

16. The controller according to claim 9, wherein the data center network is a leaf-and-spine network, and any one of the m source switch groups and the destination switch group comprises one edge switch, wherein the edge switch is connected to the plurality of transit switches, and different edge switches are respectively connected to different network nodes.

* * * * *